Figure 1:
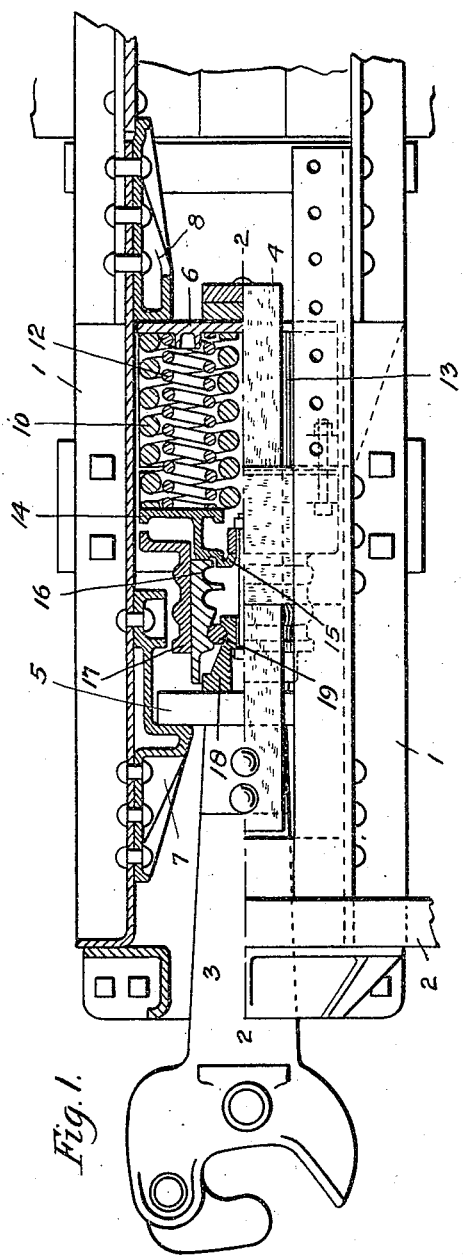

J. F. O'CONNOR.
FRICTION DRAFT GEAR.
APPLICATION FILED DEC. 28, 1910.

1,017,230.

Patented Feb. 13, 1912.
2 SHEETS—SHEET 1.

WITNESSES:
F. B. Townsend
Esther Abrams.

INVENTOR
John F. O'Connor
BY Munday Evarts
Adcock & Clarke
his ATTORNEYS

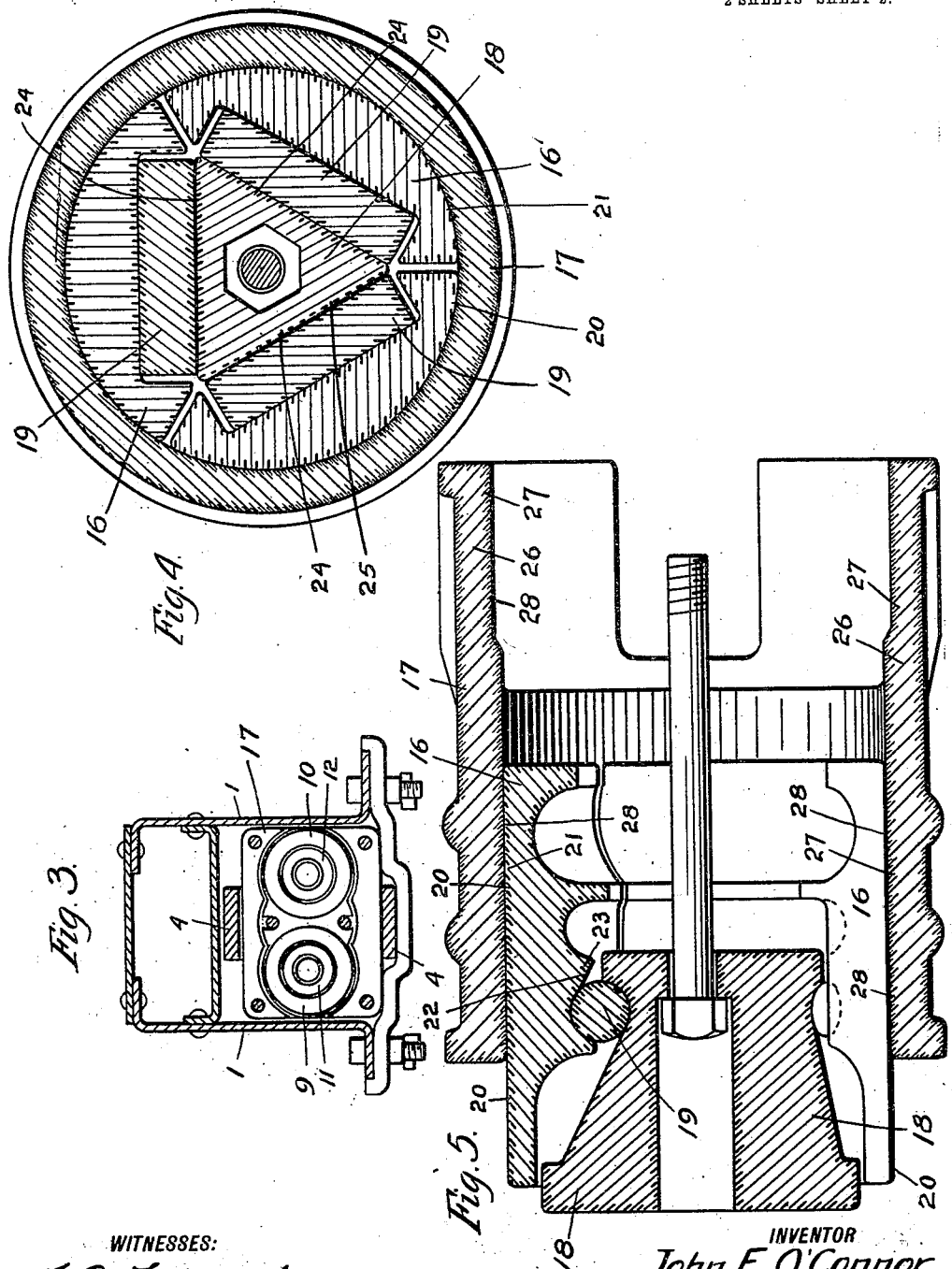

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

FRICTION DRAFT-GEAR.

1,017,230. Specification of Letters Patent. Patented Feb. 13, 1912.

Application filed December 28, 1910. Serial No. 599,754.

*To all whom it may concern:*

Be it known that I, JOHN F. O'CONNOR, a citizen of the United States, residing in Chicago, in the county of Cook and State of Illinois, have invented a new and useful Improvement in Friction Draft-Gears, of which the following is a specification.

My invention relates to improvements in friction draft gear or draft rigging for railway cars, and more particularly to friction draft rigging of the kind employing a friction shell or cylinder, friction shoes and wedge within the cylinder.

Heretofore in the practical operation of friction draft rigging of the kind to which my invention relates, difficulty is sometimes experienced from lack of uniformity in the action of the friction mechanism under different conditions of the interengaging friction faces, incident to rust and other causes affecting the coefficient of friction.

The object of my invention is to provide a friction draft gear of a strong, simple, efficient and durable construction, in which the frictional action of the shell and shoes will be substantially uniform and their interengaging friction faces maintain a substantially uniform coefficient of friction under all conditions of practical use, in which also the requisite frictional resistance may be developed without appreciable wear of either the friction shoes or shell.

My invention consists in the means which I have discovered for practically accomplishing this important and useful result, and the practical operation of which I have thoroughly demonstrated both by experiment and actual use; the same consisting essentially in the combination with friction shoes of steel or cast steel, and having case hardened, smooth, polished friction faces, of a malleable iron friction shell having an interior friction face layer or skin of relatively dense, fine grained and brittle metal, and provided with an outer oxidized coating which comes directly in contact with the smooth, polished, hardened steel friction faces of the friction shoes. This I find produces a high degree of frictional resistance without appreciable wear of either the friction shell or shoes, and the coefficient of friction of the interengaging friction faces remains substantially the same under varying conditions of practical use.

The friction shoes are preferably made of cast steel, the external friction faces being first finished or trued and ground to accurate shape and polished, and then case hardened to produce a friction face layer to a depth of a sixteenth of an inch or such matter of extremely hard steel.

To provide the friction shell or cylinder with the required relatively dense, hard, fine grained and brittle friction face layer, and with a permanent exterior oxidized coating, I subject the hard, white iron casting of which the friction shell is made, to an annealing operation in a muffled, sealed or closed annealing oven without any packing material of any kind enveloping the white iron casting either interiorly or exteriorly, so that the annealing operation itself will, while thoroughly annealing, softening and toughening the interior portion of the white iron casting, leave the same with an external layer or skin both upon its inner friction face and its outside, which is relatively dense, hard, comparatively brittle and fine grained or friable, and adapted to produce a high degree of frictional resistance when sliding under heavy pressure against a hardened steel friction shoe, the annealing operation further operating to provide this hardened, fine grained, friable, dense layer or skin with a thoroughly oxidized coating, which oxidized coating I find in practical operation, in combination with the hardened steel, smooth, polished friction shoes, permanently remains on the interior face of the friction shell and has the result of preventing the inner friction face of the shell from becoming bright, and the further result of causing the frictional resistance to remain substantially constant under all varying conditions of use. After the friction shell has thus been annealed and provided on its interior friction face with a relatively hard, dense layer provided with an oxidized coating, in order to bring the interior friction face to a true, cylindrical shape or to the form required to properly fit the external friction faces of the friction shoes, without removing or destroying its dense, inner friction face layer or skin, I subject the friction shell, when it is necessary or out of true form, to an internal shaping pressure from an expanding, shaping or truing device which is inserted within the friction shell and expanded to bring its interior to a true, cylindrical form or to such other form as may be required to properly fit the friction shoes.

Figure 2:
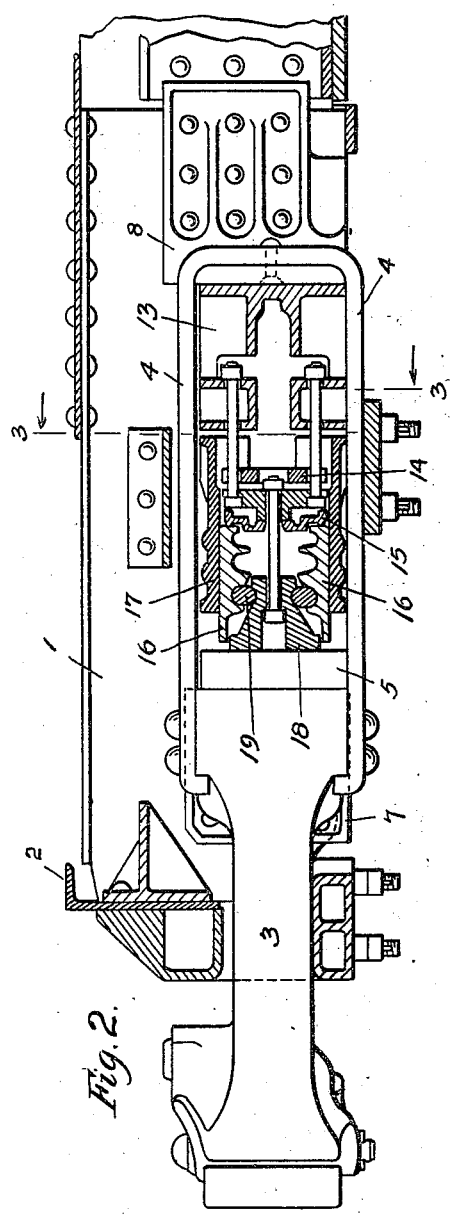

In the drawing, Figure 1 is a plan view, partly in central horizontal section of a friction draft rigging embodying my invention. Fig. 2 is a side elevation, partly in section on line 2—2 of Fig. 1. Fig. 3 is a vertical, transverse section taken on the line 3—3 of Fig. 2, and looking in the direction of the arrows. Fig. 4 is a transverse, vertical section, upon an enlarged scale, of the friction shell and shoes, and Fig. 5 is an enlarged, partial, longitudinal section of the friction shell and shoes.

In the drawing, 1 represents the center sills or draft members of the car frame to which the draft rigging is applied, 2 the front end sill, 3 the draw-bar, 4 the draft yoke, 5, 6 front and rear followers, 7, 8 stop members secured to the center sills and against which the followers abut. Twin springs 9, 10, arranged side by side, are preferably employed, the same having smaller springs 11, 12 nested within them. The springs are inclosed in a spring cage 13 with which the rear follower may be made integral. The springs bear at their front end against a twin spring cap or seat member 14 which has a central boss or bearing 15 for engagement with the rear ends of the friction shoes 16 which fit within the friction shell or cylinder 17, and are outwardly spread by the wedge 18 through the interposed anti-friction rollers 19.

The friction shoes 16 are preferably three in number, as indicated in the drawing, and the same are preferably of cast steel, and each provided with a smooth, polished external friction face 20 of hardened steel formed on the integral, external case-hardened layer 21 of the steel shoe. Each of the friction shoes also has an inclined wedge face 22 formed in a case-hardened external layer 23 of the steel shoe for engagement with the anti-friction roller 19. The wedge 18 has a plurality of wedge faces 24, formed in case-hardened layers 25 of the wedge for engagement with the anti-friction roller.

The friction shell 17 is of malleable iron and has an interior or body portion 26 of relatively soft, strong, tough, tenacious, long fibered metal, and an external inner friction face layer or skin 27 of relatively hard, dense, brittle or friable and fine or short fibered metal, provided with a permanently oxidized exterior or coating 28 constituting the internal friction face of the cylinder, which is in sliding frictional engagement with the smooth, polished, case hardened friction faces of the friction shoes.

As in my invention, the malleable iron friction shell has an integral friction face layer or skin of relatively hard, dense, brittle or friable and short fibered metal with a permanently oxidized coating or exterior portion constituting the friction face of the shell, and as the friction shoes have smooth, polished, case hardened steel friction faces, a relatively high degree of frictional resistance is developed by the sliding of the shoes on the shell under heavy pressure. And I find in practical use that the coefficient of friction remains substantially constant under varying conditions of practical use, the friction face of the cylinder remaining permanently oxidized and not having the effect of becoming bright under use, and the frictional resistance developed not materially varying under different conditions. I also find by experiment and practical use that the sliding of the friction shoes on my improved friction shell under heavy pressure, does not have the effect to produce any material or appreciable wear of either the friction shoes or friction shell, and the draft rigging is entirely free from all tendency of the inter-engaging friction elements to cut or unduly wear. As in my invention, the inner friction face layer or skin of the friction shell at the outermost portion thereof becomes highly oxidized to an appreciable depth and is thus rendered refractory and heat resisting in character, and also of a character to effectually resist any tendency to weld, fuse or metallically unite with the bright metal friction face of the steel shoes when sliding under enormously heavy pressure, the frictional resistance is produced without any appreciable tendency of the interengaging friction faces to cut or wear. The oxidized refractory outer portion of the friction face layer or skin of the friction shell serves to prevent the interengaging faces of the shell and shoes from approaching a condition or state in which cutting, grooving, or excessive wear can take place, while at the same time producing a high degree of frictional resistance.

I claim:—

1. In a friction draft rigging, the combination of friction shoes having hardened steel friction faces, of a malleable iron friction shell having an integral friction face layer or skin of relatively hard, dense, brittle metal, substantially as specified.

2. In a friction draft rigging, the combination of friction shoes having hardened steel friction faces, of a malleable iron friction shell having an integral friction face layer or skin of relatively hard, dense, brittle metal, with the outermost portion oxidized, substantially as specified.

3. In a friction draft rigging, the combination with cast steel friction shoes having hardened and polished friction faces and hardened roller bearing wedge faces, a wedge having hard roller bearing wedge faces, hard steel anti-friction rollers interposed between the wedge and friction shoes, and a malleable iron friction shell having a relatively hard and dense friction face layer in sliding frictional engagement with the hard smooth, polished friction faces of the friction shoes, substantially as specified.

4. In a friction draft rigging, the combination with cast steel friction shoes having hardened friction faces and hardened roller bearing wedge faces, a wedge having hard roller bearing wedge faces, hard steel anti-friction rollers interposed between the wedge and friction shoes, and a malleable iron friction shell having a relatively hard and dense friction face layer in sliding frictional engagement with the hard smooth, polished friction faces of the friction shoes, said friction face layer or skin of the malleable iron friction shell having its outermost portion oxidized, substantially as specified.

JOHN F. O'CONNOR.

Witnesses:
 EDMUND ADCOCK,
 PEARL ABRAMS.